United States Patent Office 3,161,636
Patented Dec. 15, 1964

3,161,636
PARAVALLARIDINE COMPOUNDS AND DERIVATIVES AND PROCESS OF MAKING SAME
Jean Le Men, Limeil-Brevannes, Seine-et-Oise, France, assignor to Roger Bellon, Neuilly-sur-Seine, Seine, France
Filed Jan. 28, 1963, Ser. No. 254,336
Claims priority, application Great Britain, Jan. 30, 1962, 3,467/62
11 Claims. (Cl. 260—239.57)

This invention relates to paravallaridine compounds and derivatives and a process of making same.

Paravallarine and paravallaridine, which are two alkaloids extracted from *Paravallaris microphylla* Pitard and which correspond, respectively, to the formulae:

(I)

and (II)

are obtained, for instance, as described in the "Bulletin de la Societe Chimique de France," 1960, page 860 (paravallarine) and in applicant's copending application Serial No. 170,569, filed February 2, 1962, now U.S. Patent No. 3,137,691, and entitled "Method for Extraction of Paravallaridine and Derivatives Thereof."

The present invention provides a process for the preparation of paravallaridine derivatives of the Formula III:

(III)

wherein

X represents the oxo group, the secondary alcohol group, or di-lower alkoxy;
Y and Z represent hydrogen or, when X is oxo or di-lower alkoxy, a second bond between the carbon atoms in 4- and 5-positions;
A represents methylene or carbonyl;
$R_1$ represents hydrogen;
$R_2$ represents hydroxyl or, when A is carbonyl, together with $R_1$, a direct oxygen to carbon bond between the oxygen atom attached to the carbon atom 18 and the carbon atom in 20-position, thereby forming a five-membered lactone ring; and B represents the oxo group or the secondary alcohol group, which process comprises reacting paravallaridine or a derivative thereof with a chlorinating agent to form the N-chlorinated derivative of paravallaridine in a first reaction step, and removing the chloramine formed in a second reaction step, thereby producing the oxo group.

Thus, the N-chlorinated derivative of paravallaridine is prepared in a first step and the chloramine which is formed is removed in a second step, for example by means of a solution of an alkali metal alcoholate in an anhydrous alcohol.

In the first step of the process it is possible to use N-chlorosuccinimide or hypochlorous acid as the chlorinating agent, the reaction taking place in the cold in an anhydrous organic solvent such as an ether or a chlorinated solvent. The excess of chlorinating agent is then removed, for instance, by washing with water, the solvent is driven off at a temperature below 40° C., the chloramine which has formed is destroyed in the second step.

Throughout this specification, the nomenclature (20S) has the same meaning as given by Cahn, Ingold and Prelog in Experientia, 1956, vol. 12, p. 81, and subsequently by Kamber, Cainelli, Anigoni and Jeger in Helv. Chim. Acta, 1960, vol. 43, p. 347.

The compounds of the above given Formula III are novel compounds which have interesting pharmaceutical properties. They have a vaso-dilatory action on the blood vessels, a sedative action on the central nervous system and a distinct anti-ulcer effect.

The following examples illustrate the invention:

EXAMPLE 1

3-Oxo-$\Delta_4$-Deaminoparavallaridine (20S)-3-OXO-16a,20-DIHYDROXY-18-OIC LACTONE(→20)-PREGNA-4-ENE A solution of paravallaridine (1 g.) in 15 cc. of methylene chloride and a solution of N-chlorosuccinimide (1 g.) in 15 cc. of the same solvent were mixed and stirred together at room temperature for two hours.

The reaction solution was washed 4 times with 50 cc. of water, dried over dry sodium sulfate and distilled in vacuo at a temperature below 40° C. The white residue (1.3 g.) was further dried for 1 hour at 20° C. in vacuo at a pressure of 0.01 mm. Hg, then heated under reflux with 50 cc. of an ethanolic solution of sodium ethanolate, prepared with 300 mg. of sodium metal.

The reaction solution, which was golden-yellow in color, was then poured into 200 cc. of a 1% aqueous solution of sulfuric acid and the whole was extracted three times with 150 cc. of chloroform. The combined chloroform solutions were successively washed with 100 cc. of a 5% aqueous solution of sodium bicarbonate and twice with 100 cc. of water, then distilled to dryness. In this way, 325 mg. of compound A were recovered.

The acid aqueous-alcoholic solution which had been extracted with chloroform was freed from alcohol by distillation, make alkaline by the addition of ammonia and than again extracted with chloroform. In this way, there were obtained, after distilling off the solvent, 390 mg. of compound B having an infra-red spectrum which can be superimposed on that of compound A.

Figure 1:
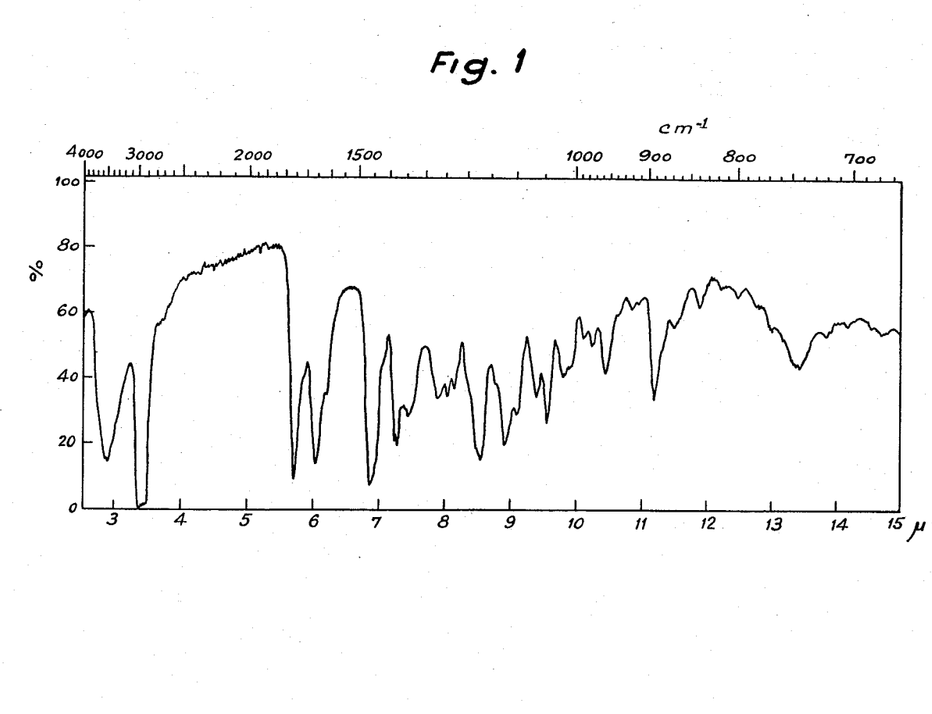

The fractions A and B were immediately combined, dissolved in chloroform and subjected to chromatography on 25 g. of alumina. By elution with a chloroform-ethanol mixture (99:1), there were recovered 630 mg. of a slightly yellowish colored compound which, on recrystallization from acetone, yielded a first bath of 140 mg. of an α,β-unsaturated ketone. Melting point: 244° C.; the infra-red spectrum thereof, which is shown in FIG. 1 of the accompanying drawings, has an OH-band at 2.9μ, a C=O lactone band at 5.7μ, a C=O α,β-unsaturated ketone band at 6.05μ and a C=C band at 6.2μ.

Figure 2:
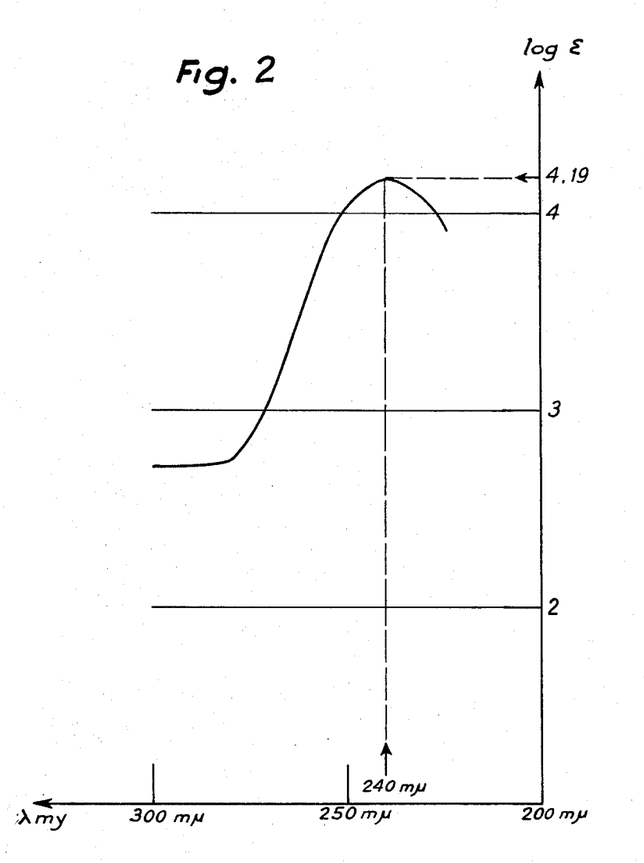

The ultra-violet spectrum, shown in FIG. 2 of the accompanying drawings, has a λ max. 240 mμ, log ε=4.18.

Analysis for $C_{21}H_{28}O_4$.—Calculated, percent: C=73.22; H=8.19; O=18.58. Found, percent: C=73.36; H=8.39; O=18.81.

EXAMPLE 2

Figure 3:
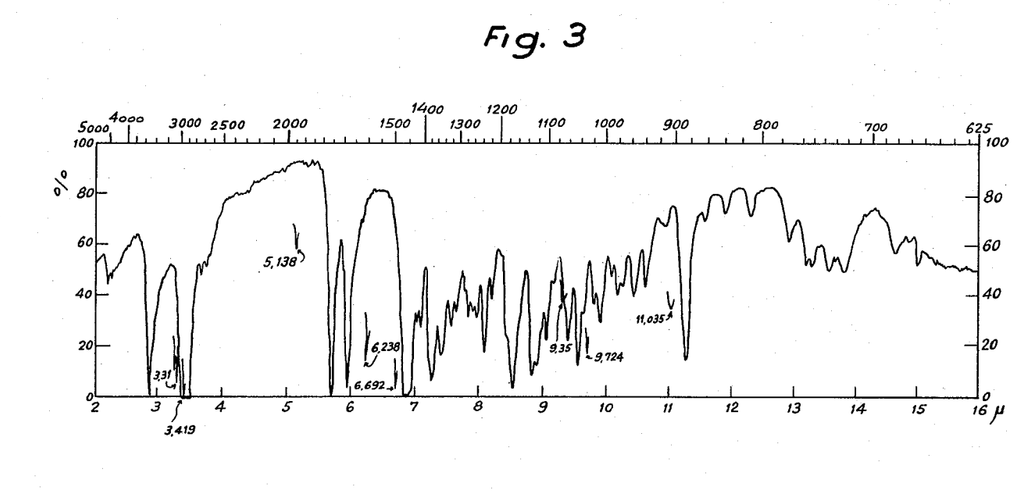

3-Oxo-Deamino-Dihydroparavallaridine (20S)-3-OXO-16α,20-DIHYDROXY-18-OIC LACTONE(→20)-5α-PREGNANE Using a technique similar to that of Example 1, 1 g. of dihydroparavallaridine yielded 590 mg. of a crude saturated ketone which, by simple recrystallization from methanol, gave a first batch of 370 mg. of 3-oxo-deaminodihydroparavallaridine. Melting point: 252° C.; the infrared spectrum, shown in FIG. 3 of the accompanying drawings, has an OH-band at 2.92μ, a C=O lactone band at 5.7μ, a C=O non-conjugated ketone band at 5.95μ. $(\alpha)_D=0°\pm2°$ (concentration=0.25% in chloroform).

Analysis for $C_{21}H_{30}O_4$.—Calculated, percent: C=72.80; H=8.73; O=18.47. Found, percent: C=72.61, 72.78; H=8.66, 8.78; O=18.12, 18.03.

EXAMPLE 3

2β-Hydroxy-Deamino-Dihydroparavallaridine (20S)-3β,16α,20-TRIHYDROXY-18-OIC LACTONE(→20)-5α-PREGNANE

[Reduction of 3-oxo-deamino dihydroparavallaridine by means of potassium boron hydride]

250 mg. of 3-oxo-deamino-dihydroparavallaridine were dissolved in 20 cc. of methanol and stirred for 2 hours with 1 g. of potassium boron hydride.

The solution was diluted with 75 cc. of water and extracted with chloroform. The decanted chloroform solution was washed with water, dried and then distilled to leave 220 mg. of a residue, which, on recrystallization from acetone, yielded 140 mg. of 3β-hydroxy-deamino-dihydroparavallaridine. Melting point: 235° C.; $(\alpha)_D=-12.9°$ (concentration=0.27% in chloroform).

Analysis for $C_{21}H_{32}O_4$.—Calculated, percent: C=72.62; H=8.93. Found, percent: C=72.33; H=9.13.

Figure 4:
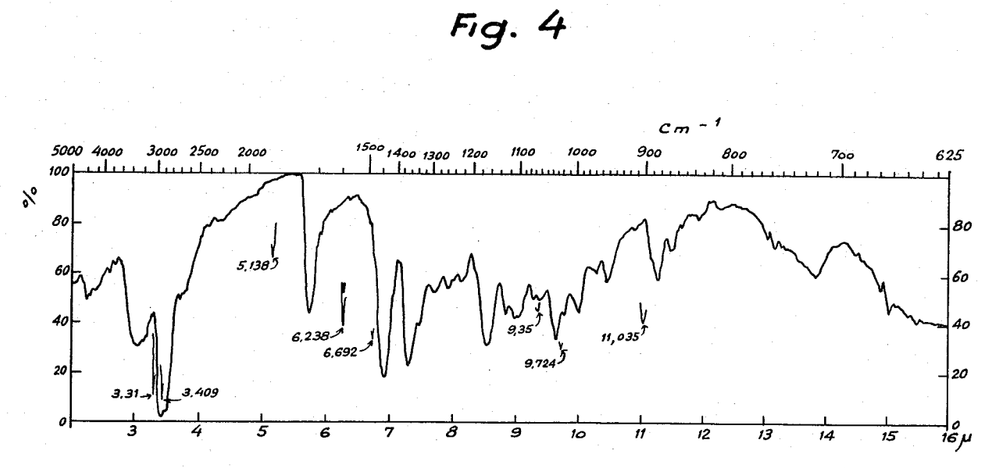

The infra-red spectrum of this compound is shown in FIG. 4 of the accompanying drawings.

In the following examples, the keto group was temporarily blocked in the 3-position of the deamino-3-oxo-dihydroparavallaridine of Example 2 by conversion into the diketal form (Example 4) in order to permit selective opening of the lactone ring by reduction by means of lithium aluminum hydride (Example 6).

The same result can be obtained by temporarily blocking the keto group of Example 2 by conversion into the dioxolane form.

Careful chromic acid oxidation of the compound according to Example 2 yielded the diketone of Example 5. The tetrol of Example 7 was also obtained by reduction, the compound of Example 6 with potassium boron hydride $KBH_4$, or the lactone diol of Example 2 with lithium aluminum hydride.

The tetrol of Example 8 was obtained by reduction of the diketone of Example 5 with $LiAlH_4$.

EXAMPLE 4

3β,3α-Dimethoxy De-Amino Dihydroparavallaridine (20S)-3β,3α-DIMETHOXY-16α,20-DIHYDROXY-18-OIC LACTONE(→20)-5α-PREGNANE To the solution of 150 mg. of (20S)-3-oxo-16α,20-dihydroxy-18-oic lactone(→20)-5α-pregnane in 3 cc. of anhydrous methanol, there were added 5 mg. of paratoluenesulfonic acid and the mixture was heated to 100° C. for 5 minutes. After cooling, the reaction solution was made alkaline by the addition of sodium methanolate, then diluted with 200 cc. of water and extracted three times with 200 cc. of ether. The combined ethereal solutions were washed with water, dried and then evaporated to dryness to yield a residue weighing 149 mg. The desired dimethoxylated derivative was obtained therefrom by recrystallization from methanol. Melting point: 184° C.; $(\alpha)_D=-11°$ (concentration=0.82% in chloroform).

Analysis for $C_{23}H_{26}O_5$.—Calculated, percent: C=70.37; H=9.24. Found, percent: C=70.19; H=9.15.

Figure 5:
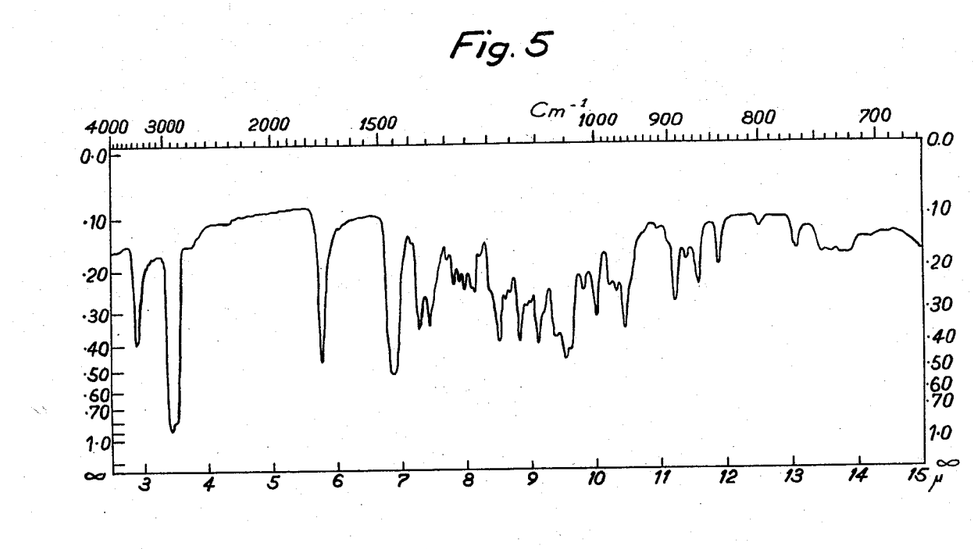

The infra-red spectrum of this compound is shown in FIG. 5 of the accompanying drawings.

EXAMPLE 5

3,16-Dioxo Deamino Dihydroparavallarine (20S)-3,16-DIOXO-20-HYDROXY-18-OIC LACTONE(→20)-5α-PREGNANE A mixture of a solution of 300 mg. of ((20S)-3-oxo-16α,20-dihydroxy-18-oic lactone(→20)-5α-pregnane) in 10 cc. of acetic acid and of a solution of 450 mg. of chromic acid anhydride in 25 cc. of water was heated on a boiling water bath for 5 minutes and then stirred at room temperature for 2 hours. After diluting the reaction mixture by adding it to 200 cc. of water and making it alkaline by the addition of sodium carbonate, the precipitate was extracted with 500 cc. of chloroform. The decanted chloroform solution was washed with water and dried over anhydrous sodium sulfate and, after distilling off the solvent, a residue of 220 mg. was obtained which yielded the desired diketone when recrystallized from acetone. Melting point: 239° C.; $(\alpha)_D=-188°$ (concentration=0.26% in chloroform).

Analysis for $C_{21}H_{28}O_4$.—Calculated, percent: C=73.22; H=8.19; O=18.59. Found, percent: C=73.05; H=8.07; O=18.49.

Figure 6:
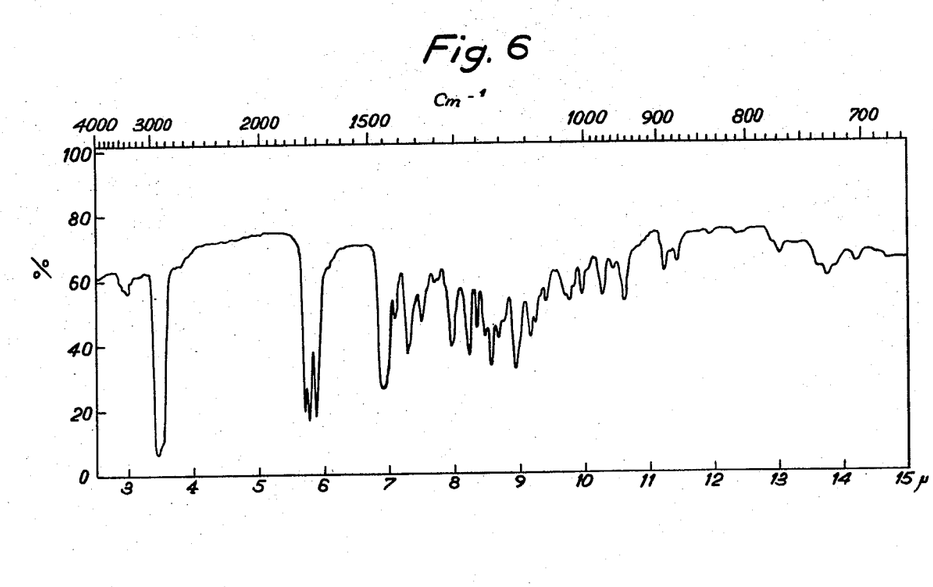

The infra-red spectrum of this compound is shown in FIG. 6 of the accompanying drawings.

EXAMPLE 6

*3-Oxo Deamino Dihydroparavallaridinol*

(20S)-3-OXO-16α,18,20-TRIHYDROXY-5α-PREGNANE

To a solution of 245 mg. of (20S)-3α,3β-dimethoxy-16α,20-dihydro-18-oic lactone(→20)-5α-pregnane (or 3β,3α-dimethoxy-deamino-dihydroparavallaridine) in 5 cc. of tetrahydrofuran and 20 cc. of ether, there were added 200 mg. of lithium aluminum hydride, and the mixture was refluxed for 5 hours. After destroying the excess of said reducing agent by the addition of 100 cc. of moist ether and 5 cc. of methanol, there were added 5 cc. of a saturated aqueous solution of sodium sulfate and then 20 g. of anhydrous sodium sulfate. The organic liquid phase was decanted, washed with water, then dried and finally evaporated to dryness to yield a residue weighing 206 mg. This residue was then heated under reflux for 15 minutes with 10 cc. of a methanolic solution containing 2% of sulfuric acid. The resulting solution was diluted with 200 cc. of water and extracted with 250 cc. of ether; the ethereal phase was washed with water, dried and then evaporated to dryness to yield a residue of 200 mg. The desired compound was obtained therefrom by recrystallization from acetone. Melting point: 198° C.; $(\alpha)_D = +24°$ (concentration=0.73% in chloroform).

Analysis for $C_{21}H_{34}O_4$.—Calculated, percent: C=71.96; H=9.78. Found, percent: C=72.08; H=9.90.

Figure 7:
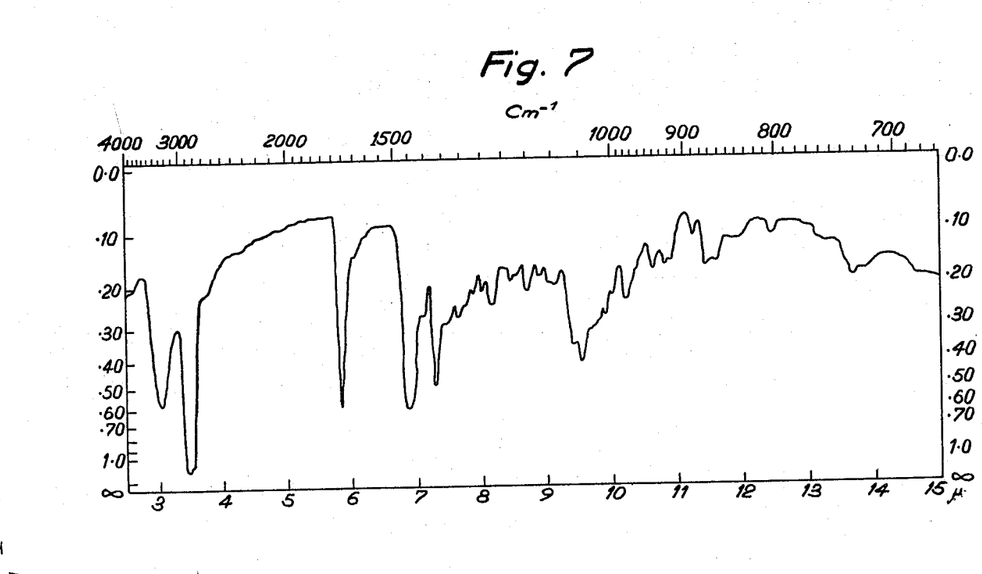

The infra-red spectrum of this compound is given in FIG. 7 of the accompanying drawings.

EXAMPLE 7

*(20S)-3β,16α,18,20-Tetrahydroxy-5α-Pregnane*

A solution of 100 mg. of (20S)-3-oxo-16α,18,20-trihydroxy-5α-pregnane in 20 cc. of methanol was stirred at room temperature for three hours with 500 mg. of potassium boron hydride. The reaction solution was diluted in 200 cc. of water and extracted twice with 250 cc. of chloroform. The decanted chloroform solutions were combined, washed with water, dried, and then finally evaporated to dryness. The resulting residue, after heating with stirring under reflux with 10 cc. of boiling benzene and filtering while hot, yielded 82 mg. of the desired tetrol on filtering. Melting point: 245° C. (decomposition from 235° C. on); $(\alpha)_D = +7°$ (concentration=0.51% in methanol).

Analysis for $C_{21}H_{36}O_4$.—Calculated, percent C=71.55; H=10.30. Found, percent: C=71.48; H=10.12.

The same compound could be obtained by reduction of (20S)-3β-hydroxy-16α,20-dihydroxy-18-oic lactone(→20)-5α-pregnane by means of lithium aluminum hydride in a mixture of tetrahydrofuran (1 part) and ether (5 parts).

Figure 8:
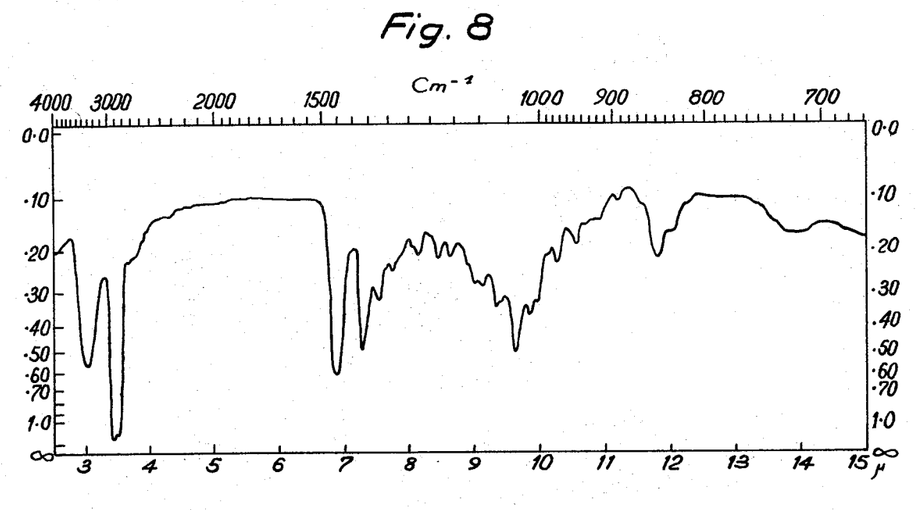

The infra-red spectrum of this compound is shown in FIG. 8 of the accompanying drawings.

EXAMPLE 8

*(20S)-3β,16β,18,20-Tetrahydroxy-5α-Pregnane*

100 mg. of (20S)-3,16-dioxo-20-hydroxy-18-oic lactone(→20)-5α-pregnane (or 3,16-dioxodeaminoparavallaridine) were dissolved in 1 cc. of tetrahydrofuran and 100 cc. of ether and reduced by means of 300 mg. of lithium aluminum hydride by boiling the reaction mixture for five hours. After destroying the excess of lithium aluminum hydride by the addition of 50 cc. of moist ether and 1 cc. of methanol, there were added 100 cc. of normal hydrochloric acid solution and then 500 cc. of chloroform. The organic layer was decanted, washed with water, dried and distilled. There was thus obtained a dry residue which was washed with 50 cc. of boiling benzene and then recrystallized from methanol to yield 80 mg. of the desired tetrol. Melting point: 258° C.; $(\alpha)_D = +43°$ (concentration=0.55% in methanol).

Analysis for $C_{21}H_{36}O_4$. — Calculated, percent: C=71.55; H=10.30. Found, percent: C=71.69; H=10.43.

Figure 9:
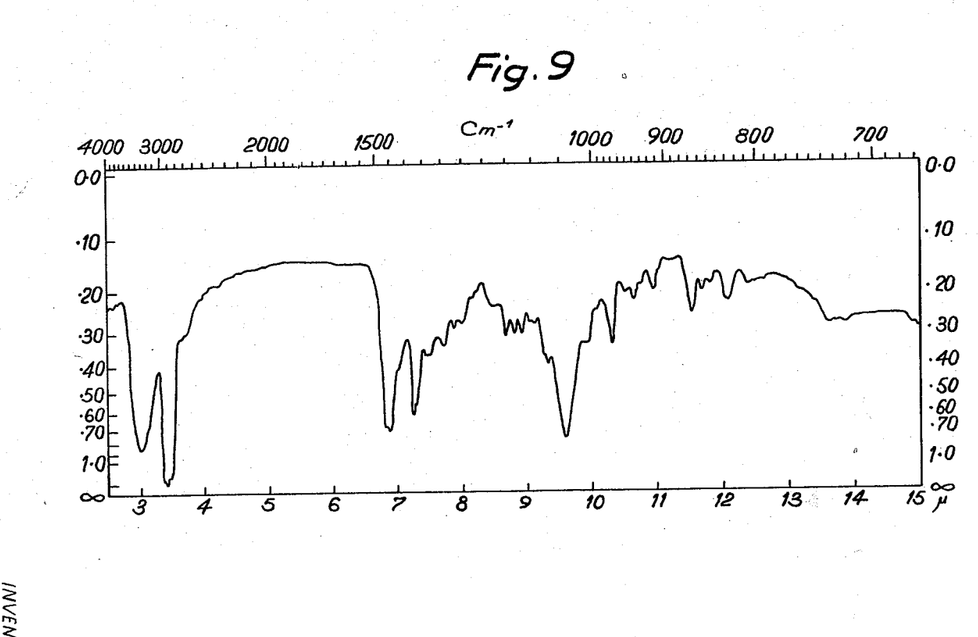

The infra-red spectrum of this compound is shown in FIG. 9 of the accompanying drawings.

I claim:

1. The paravallaridine derivative of the formula:

wherein

X represents a member selected from the group consisting of oxo, the secondary alcohol group, and lower dialkoxy;

A represents a member selected from the group consisting of methylene and carbonyl;

$R_1$ represents hydrogen;

$R_2$ represents a member selected from the group consisting of hydroxyl and, when A is carbonyl, forming together with $R_1$ and oxygen to carbon bond to complete a five-membered lactone ring;

B represents a member selected from the group consisting of hydroxyl and oxo; and Y and Z are members selected from the group consisting of hydrogen and, when X is oxo and di-lower alkoxy, a second carbon to carbon bond between the carbon atoms in 4- and 5-positions.

2. (20S) - 3 - oxo - 16α,20 - dihydroxy - 18-oic lactone (→20)-pregna-4-ene.

3. (20S) - 3 - oxo - 16α,20 - dihydroxy-18-oic lactone (→20)-5α-pregnane.

4. (20S)-3β,16α-20-trihydroxy-18-oic lactone (→20)-5α-pregnane.

5. (20S)-3β,3α-dimethoxy-16α,20-dihydroxy - 18 - oic lactone(→20)-5α-pregnane.

6. (20S)-3,16-dioxo-20-hydroxy-18-oic lactone(→20)-5α-pregnane.
7. (20S)-3-oxo-16α,18,20-trihydroxy-5α-pregnane.
8. (20S)-3β,16α,18,20-tetrahydroxy-5α-pregnane.
9. (20S)-3β,16β,18,20-tetrahydroxy-5α-pregnane.
10. In a process of producing a paravallaridine derivative of the formula:

wherein
X represents a member selected from the group consisting of oxo, the secondary alcohol group, and lower dialkoxy;
A represents a member selected from the group consisting of methylene and carbonyl;
$R_1$ represents hydrogen;
$R_2$ represents a member selected from the group consisting of hydroxyl and together with $R_1$, when A is carbonyl, forming an oxygen to carbon bond to complete a five-membered lactone ring;
B represents a member selected from the group consisting of hydroxyl and oxo, and
Y and Z are members selected from the group consisting of hydrogen and, when X is oxo and di-lower alkoxy, a second carbon to carbon bond between the carbon atoms in 4- and 5-positions;
the steps which comprise chlorinating a paravallaridine compound of the formula wherein
Y and Z are members selected from the group consisting of hydrogen and a second carbon to carbon bond between the carbon atoms in 5- and 6-positions,
with a chlorinating agent, selected from the group consisting of N-chloro succinimide and hypochlorous acid to form the corresopnding N-chlorinated derivative and reacting said derivative with a solution of an alkali metal alcoholate in an anhydrous alcohol to convert the chloro methylamino group into the oxo group.

11. In a process of producing a paravallaridine derivative of the formula:

wherein
X represents a member selected from the group consisting of oxo, the secondary alcohol group, and lower dialkoxy;
A represents a member selected from the group consisting of methylene and carbonyl;
$R_1$ represents hydrogen;
$R_2$ represents a member selected from the group consisting of hydroxyl and, when A is carbonyl, together with $R_1$ forming an oxygen to carbon bond to complete a five-membered lactone ring;
B represents a member selected from the group consisting of hydroxyl and oxo, and
Y and Z are members selected from the group consisting of hydrogen and, when X is oxo and di-lower alkoxy, a second carbon to carbon bond between the carbon atoms in 4- and 5-positions,
the steps which comprise chlorinating a paravallaridine compound of the formula wherein
Y and Z are members selected from the group consisting of hydrogen and a second carbon to carbon bond between the carbon atoms in 5- and 6-positions,
with a chlorinating agent, selected from the group consisting of N-chloro succinimide and hypochlorous acid at room temperature in an anhydrous organic solvent, to form the corresponding N-chlorinated derivative, removing the excess chlorinating agent by washing with water, distilling off the organic solvent at a temperature below 40° C., and reacting said N-chlorinated derivative with a solution of an alkali metal alcoholate in an anhydrous alcohol to convert the chloro methylamino group into the oxo group.

No references cited.